March 8, 1955 M. MAUL 2,703,618

MACHINE FOR COPYING DATA ON TO RECORD CARDS

Filed Sept. 19, 1952 7 Sheets-Sheet 1

Inventor:
Michael Maul
ATTY.

March 8, 1955  M. MAUL  2,703,618
MACHINE FOR COPYING DATA ON TO RECORD CARDS
Filed Sept. 19, 1952  7 Sheets-Sheet 3

Inventor:
Michael Maul

March 8, 1955 M. MAUL 2,703,618
MACHINE FOR COPYING DATA ON TO RECORD CARDS
Filed Sept. 19, 1952 7 Sheets-Sheet 4

Inventor:
Michael Maul

March 8, 1955  M. MAUL  2,703,618
MACHINE FOR COPYING DATA ON TO RECORD CARDS
Filed Sept. 19, 1952  7 Sheets-Sheet 5
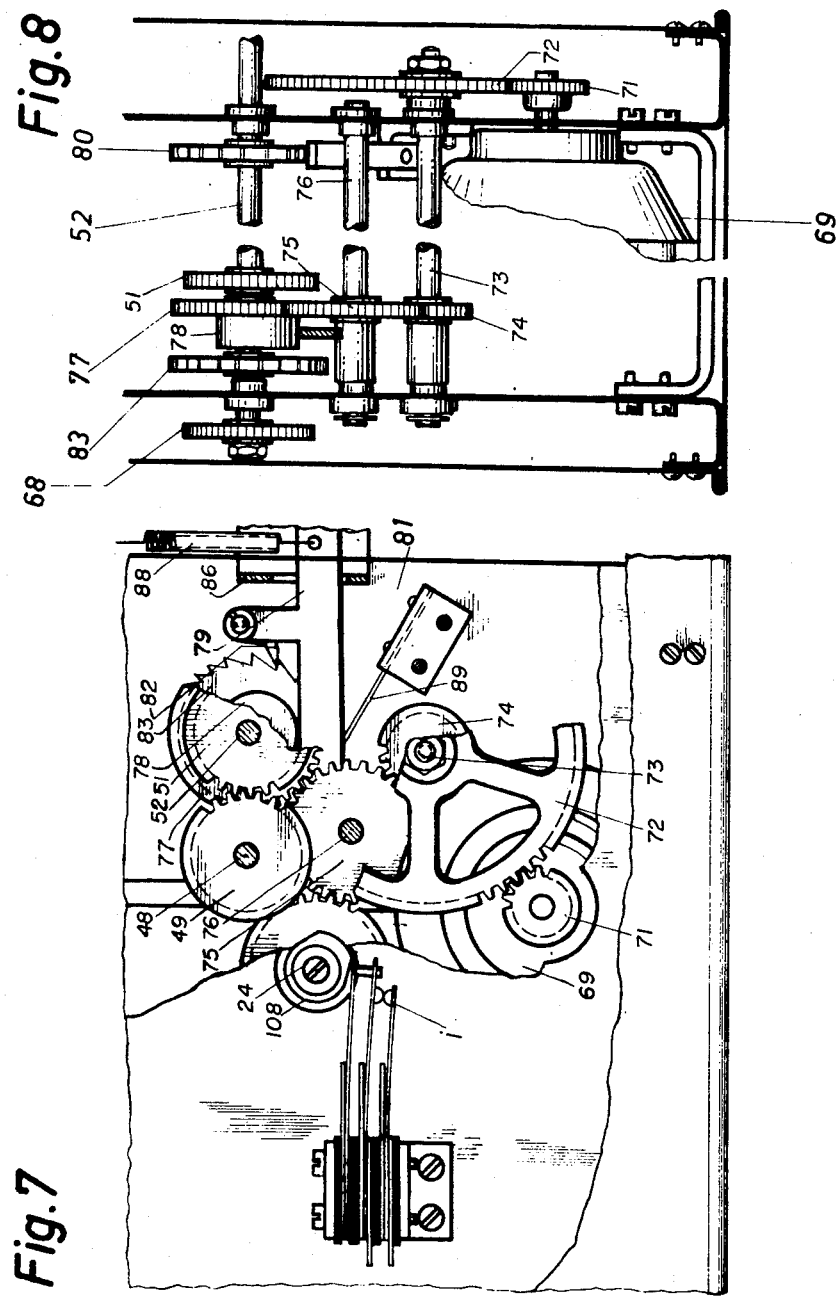
Inventor:
Michael Maul March 8, 1955 M. MAUL 2,703,618
MACHINE FOR COPYING DATA ON TO RECORD CARDS
Filed Sept. 19, 1952 7 Sheets-Sheet 6

Inventor:
Michael Maul
By
ATTY.

March 8, 1955     M. MAUL     2,703,618
MACHINE FOR COPYING DATA ON TO RECORD CARDS
Filed Sept. 19, 1952     7 Sheets-Sheet 7
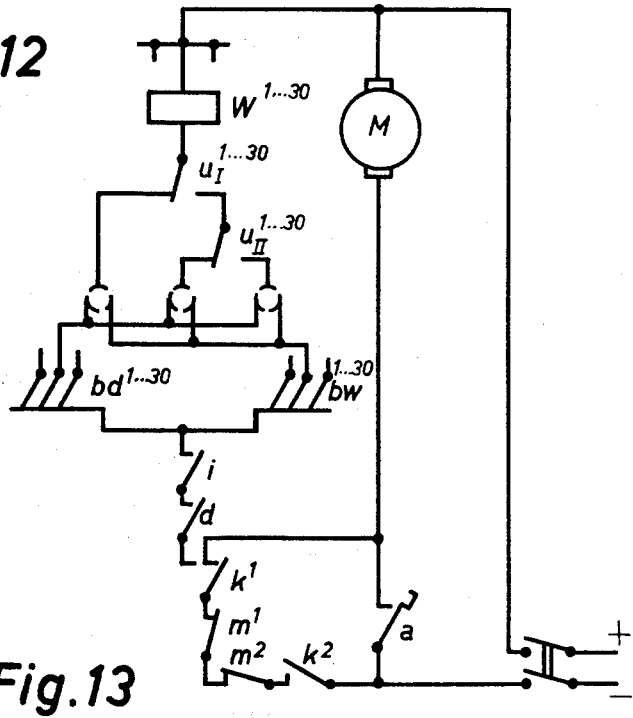
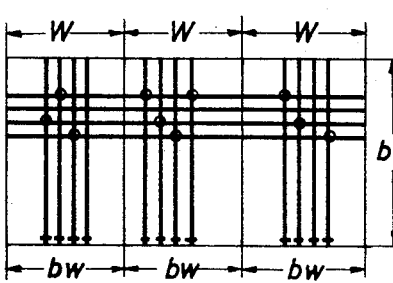
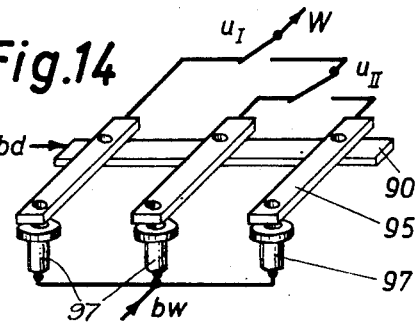
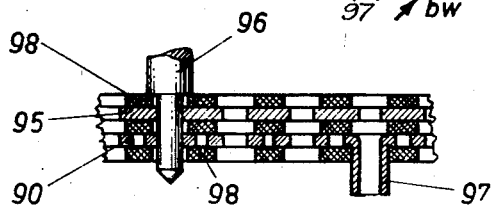
Inventor:
Michael Maul

United States Patent Office 2,703,618
Patented Mar. 8, 1955

2,703,618

MACHINE FOR COPYING DATA ON TO RECORD CARDS

Michael Maul, Schwabach, near Nurnberg, Germany

Application September 19, 1952, Serial No. 310,525

Claims priority, application Germany September 26, 1951

2 Claims. (Cl. 164—115)

In the art of perforated record card machinery it is frequently necessary to transfer data from one card to another. This operation can be designated in a most general sense as perforation copying. In such perforation copying however two different methods must be distinguished.

The one method of copying consists in entering into a stack of receiving cards constant data (such as the date). This is effected by so called repetition punching in such a way that a card bearing the constant perforation data precedes the stack of cards to be punched (receiving cards), the data of the preceding card being analyzed by an analyzing device and transferred by a punching mechanism controlled by the latter, to the following card, which is the first receiving card. When the first receiving card passes under the analyzers, it will again control the punches in agreement with the constant data which are now transferred to the second receiving card, and in such manner the operation will continue through the whole stack of cards.

A second method of perforation copying consists in "reproducing" a stack of cards, that is to say that the data on the "pattern cards" of this stack of cards are transferred to the cards of another stack of cards (such as a stack of blank cards). Such machines are then called "card reproducers."

Now, machines are also known (see Lake's Reissue 21,133, June 27, 1939) which may be set to operate either as repetition punches or as card reproducers. Moreover they permit a combined manner of operation in such a way that, in the same card passage, from the preceding card a perforation repetition is effected upon the follower card of the cards of the receiving card stack, while at the same time, from the stack of pattern cards running in parallel with the stack of receiving cards through the machine, reproducing can be effected upon the receiving cards.

In a particularly efficient type of such machines, to which type also the present invention relates, the adjacent columns of the pattern card as well as the adjacent columns of the "repetition card," which means the card which controls the hole repetition, are analyzed by a set of analyzing means provided across the feeding path of the cards and extending over all columns, and in the same manner is provided a set of punching means.

Since in such machines it is necessary that certain columns may be eliminated in perforation repetition as well as in card reproducing, it is usual to equip such machines with a device which can be termed a "column selector." It is further possible to construct the column selector in such a way that "column interchangeability" exists, so that, particularly in card reproducing, the data in certain columns of a pattern card can be transferred to other columns of a receiving card.

The essential features of the present invention now consist in that a combined repetition punch and card reproducer is equipped for punching of multi-deck cards in such a manner that, for all decks, each of which consists of a row of adjacent perforation columns, only a single set of analyzers for the repetition cards and also only a single set of analyzers for the pattern cards are provided said sets being common to all decks, and that in addition there is provided for the receiving cards a set of punches common to all decks, past which set of punches the perforation decks are fed consecutively, each perforation deck having an individual presettable set of column selectors associated therewith, which column selectors, in accordance with the passage of the perforation decks past the sets of analyzers or the set of punches, are individually brought periodically into operative automatic connection with the sets of analyzers coacting with the punches, so that, in a single card passage, the hole repetition as well as reproducing can be effected in certain or in all perforation decks in accordance with the perforation column selection in the sets of column selectors associated with the decks.

A particularly preferred embodiment of the invention leads to a very small and simple machine, if each set of analyzing means comprises only one analyzer for each column, and if moreover the set of punching means comprises only one punch for each column.

A card reproducer for multi-deck cards permitting perforation repetition as well as card reproducing and also the combined operation is already known per se from the German Patent 747,603. In that case the column selection is effected by a selector card permitting, for each deck, a column selection predeterminable by a perforation. The known machine, however, is of a type other than that of the invention, since analyzing and punching is effected therein column by column. The set of punches and the set of analyzers are not common to all decks but are provided separately for each deck, nor is there a periodical connection of the same to the column selecting device associated with the various decks. In addition to the lower efficiency of this known machine, which is due to the column by column operation it has above all the disadvantage that the frequently desired column interchanging in the receiving card with respect to the pattern card is not possible, since the known machine can produce the receiving perforation only in the same column in which the controlling perforation of the pattern card is provided.

Frequently it is desired that, in machines to which the invention relates, the data of the pattern card can be transferred in other columns of the receiving card. Such "column interchangeability" within each deck is obtained in a preferred embodiment of the invention in that the column selector device for each perforation deck is provided as a plug multiple with groups of crossing contact bars, the latter being connected to each other at the crossing points by wireless plugging, the one group being connected to the analyzing brushes for the pattern card and the other group being connected to the punching magnets for the punches. In the preferred embodiment the same plug multiple is also used for connecting the brush which analyzes the repetition card to the punch magnets.

By means of the described device it is therefore possible, if, for instance, triple deck cards are used, to set the perforation repetition for each deck for a certain column by plugging, and to select the card reproducing also separately for each deck, while maintaining the additional possibility of column interchangeability in the reproducing operation.

An embodiment of the invention is illustrated in the accompanying drawings.

Figs. 7 and 8 show the drive as viewed from the motor, from the front and from the side.

Fig. 12 shows the circuit diagram.

Figs. 13 to 15 show the arrangement of the plug board.

Principle of operation

The machine may be used for the above mentioned different manners of operation singly as well as in combination. In the one instance the machine can operate as a card reproducer in which instance the entries on one card are transferred to another card. It is then possible to interchange the columns within one deck by a column selector device. In the description which follows the pattern card from which the entries are analyzed will be designated as card I and the card on which reproducing is effected, as card II.

In the other instance the machine can operate as a repeating punch wherein the same entries are made in a plurality of cards. In this case the entries on a card are always transferred to the subsequent card in which instance column interchanging is not required. Upon insertion of the cards therefore, the lowermost card must be punched with the repeating perforation. Now in the machine the entries are transferred from the above mentioned card to the subsequent card and from the latter again to the next following card. In this instance it must be possible to exclude certain columns from the transfer. This is necessary if the constant data are punched in cards in which there are already other entries.

In the machine described herein also both of the above mentioned instances can occur at the same time so that the machine will operate at the same time as a card reproducer as well as a repeating punch. In this instance the entries are derived from the preceding (repetition card) as well as from another card (pattern card I) and are punched in the receiving card.

Figure 1:
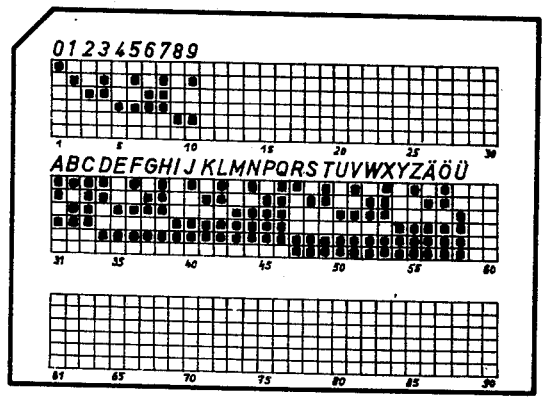
Fig. 1 shows a triple deck card as used in the machine described herein.
Figure 2:
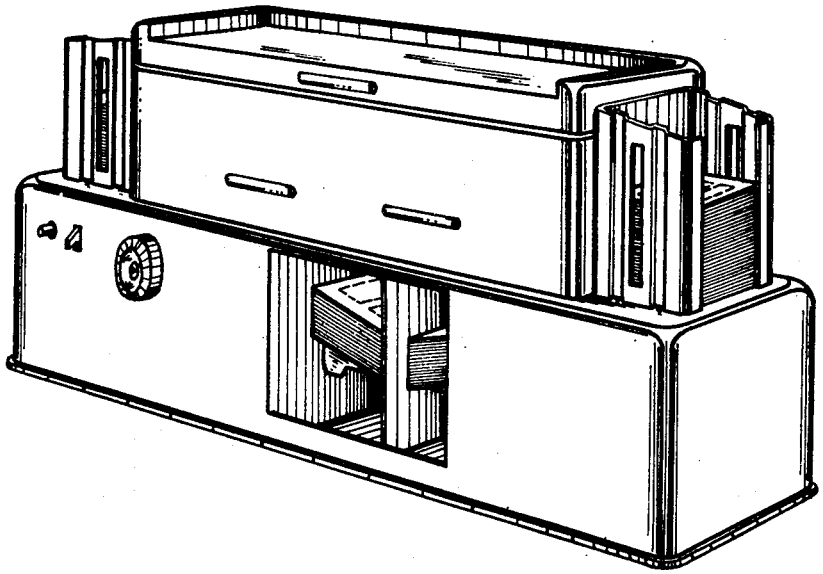
Fig. 2 shows a perspective general view of the machine.

The machine operates on cards of the kind shown for instance in Fig. 1. The card has three decks each comprising 30 columns, each column including six hole positions. The perforations in the card are in the form of hole combinations.

The column interchangeability within each deck as is necessary for the case of the card reproducer is obtained by a plug board on which any analyzing brush may be electrically connected to any desired perforation position. In order to permit column selection for each individual deck in cards having a plurality of decks and in order to permit card reproducing in a single card passage, each deck has an individual plug board associated therewith. The analyzing device and the punching mechanism are connected to these plug boards consecutively depending on which deck is below the same.

For the case of repetition punching a device is produced which permits the analyzing brushes for analyzing the preceding card to be connected, selectively to the punches of the same column. In practice the latter is provided in the plug board for the column selection. The construction of the plug board will be referred to later on.

The cards I from which the entries are analyzed are inserted into the right hand magazine 11 (Fig. 3) and the cards II into which the entries are to be made are inserted into the left hand magazine 12. The card I is moved by card knives between the feed rollers 13 and is fed by the latter under the analyzing brushes *bd* for reproducer punching. The analysis of all columns of one row is effected simultaneously while the various hole positions are analyzed and transferred consecutively. The feed of the card is effected step by step. Simultaneously with the card I a card II has been moved under the punching device under which the card is also fed step by step. The perforations in the card I which have been analyzed by the brushes *bd* control the corresponding selected punches which punch the card II. After the card I has been analyzed it is fed to the card receiver 14. After the card II has been perforated, however, it will for repetition punching, pass at first under the analyzing device with the brushes *bw* and then into the card receiver 15.

Now, if the machine is to operate either as a card reproducer or as a repetition punch, the brushes *bd* or *bw* are connected through the plug board to the punching mechanism in a manner to be described later.

The machine can, however, also operate at the same time as a card reproducer and repetition punch; for this purpose the brushes *bd* as well as the brushes *bw* are connected to the plug board. Moreover in the magazine 11 an unpunched card must be inserted at the bottom of the stack of cards including the cards I in order to obtain synchronism with the cards II in the magazine 12 in which there is the repetition card at the bottom in which, however, no perforations are to be made.

Analysis and punching

Figure 3:
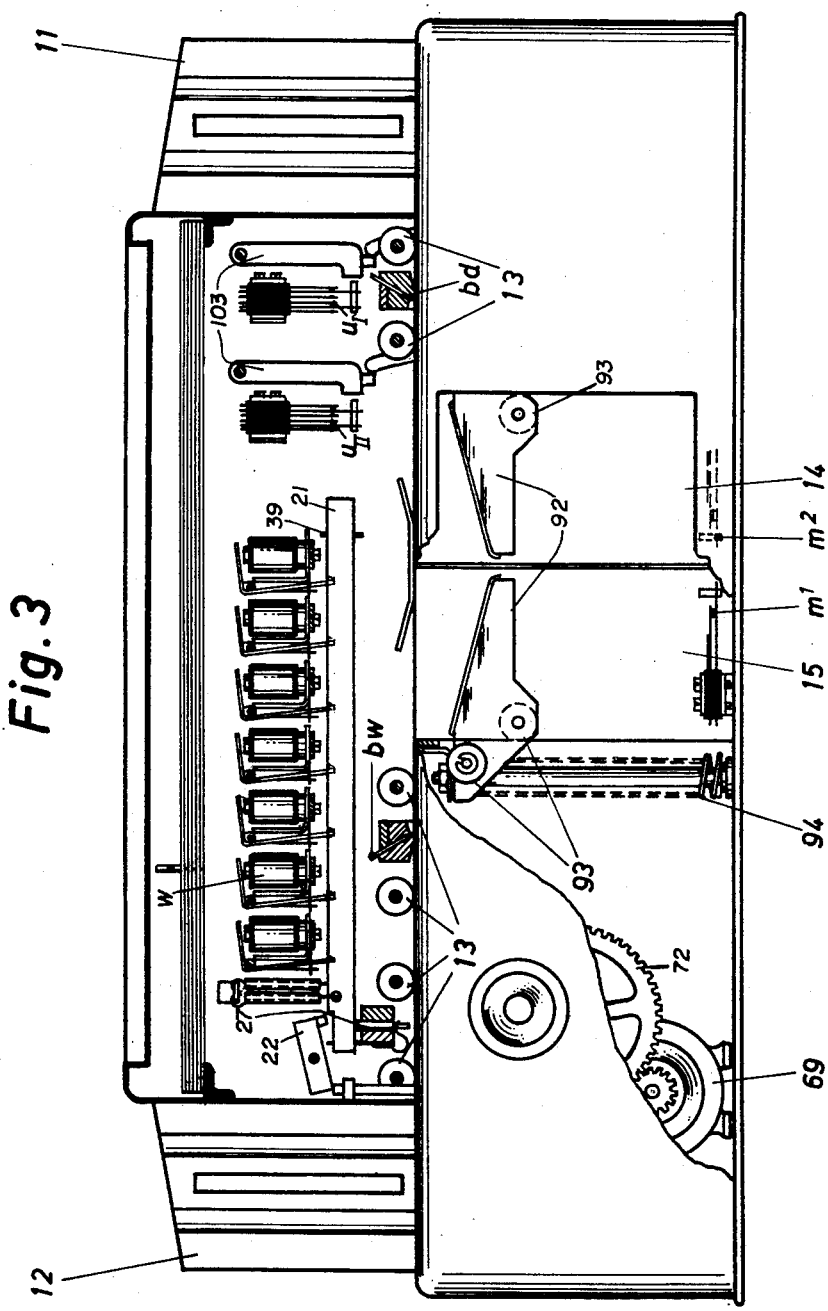
Fig. 3 shows the machine partially in section and partially in front view.
Figure 5:
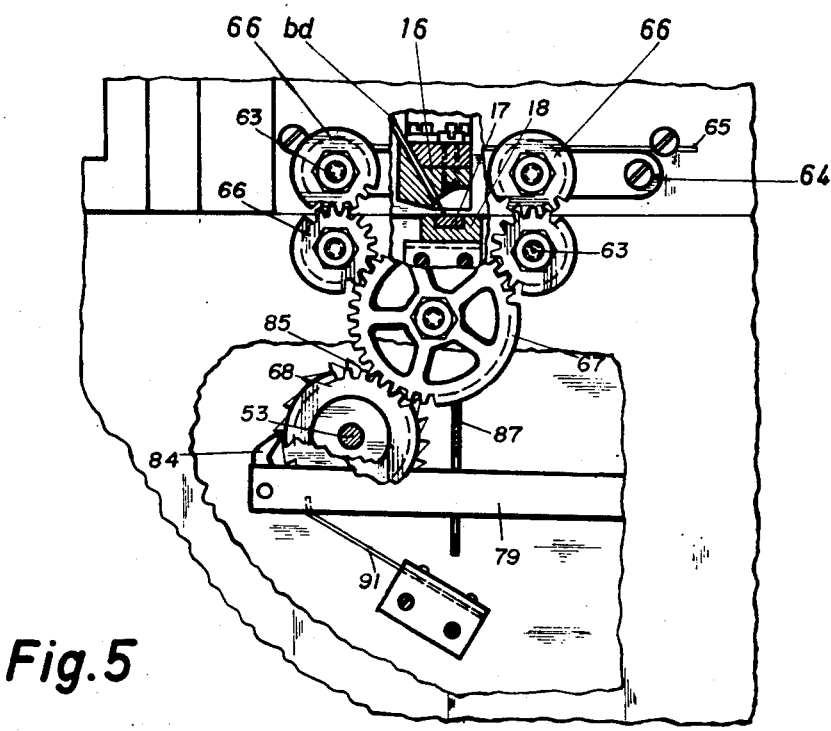
Fig. 5 shows the analyzing brushes for card reproducing and the drive for the card feed also as viewed from the rear side of the machine.

The analysis of the card I is effected by the brushes *bd* (Figs. 3 and 5). They are held in the holder 16 which is fastened in the side walls of the machine. Under the brushes there is the contact plate 17, which is inserted in the insulating body 18, also fastened in the side walls of the machine.

Figure 6:
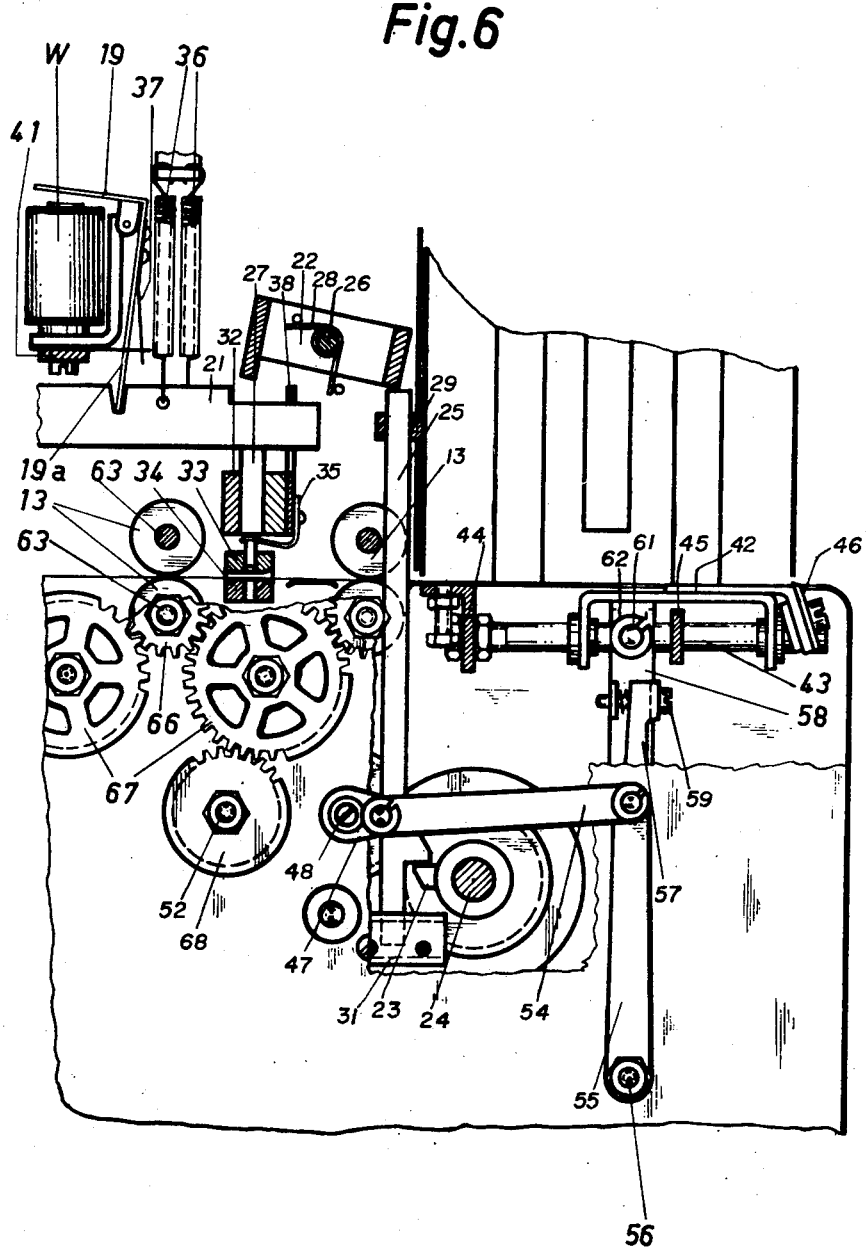
Fig. 6 shows the arrangement of the punching device and the card supply as viewed from the rear side of the machine.

The brushes receive current from the contact plate 17 through the holes in the card I and conduct this current to the selector magnets W (Fig. 6). Upon energization the latter will attract their armatures 19 which, by means of their arms 19a move the selector bars 21 to the right (Fig. 6) so that the portions of said bars which are of full depth come under the punching yoke 22.

By means of the cam 23 on the shaft 24 which rotates once per card feed for one hole position (feeding step) the punching yoke 22 is rocked through the pusher bar 25 in counter-clockwise direction about its shaft 26 thus pressing the displaced selector bars 21 downward. The latter engage their punches 27 and press the latter through the card II which passes under the punching device at the same speed as that at which the card I passes under the analyzing device having the brushes *bd*. The shaft 26 for the punching yoke is mounted in the side walls of the machine. The spring 28 restores the yoke 22 and the pusher bar 25 to their home position. The pusher bar 25 is guided at its upper part in the guide 29 and at its lower part in the bracket 31. The guide 31 serves at the same time as a stop for the movement of the pusher bars in the downward direction.

The punches 27 are guided by their shanks in a cross bar 32 which is fastened to the side walls of the machine. The rectangular part of the punch is separately guided in a cross bar 33 which is fastened to the matrix 34. Between the cross bar 33 and the matrix 34 there is a gap through which the card may be fed. The springs 35 urge the punches 27 to their home position. By springs 36, and, through the armature 19, by means of spring 37, the selector bars 21 are restored to their home position. The selector bars are guided in slots of the plate 38 which is fastened to the cross bar 32 and to the stirrup 39 (Fig. 3). The selector magnets W are screwed to the stirrups 41 which are fastened to the side walls of the machine.

After the card II has been punched it will pass under the analyzing brushes *bw* (Fig. 3) from which also entries may be transferred to the selector magnets W (repetition punching). The cooperation of the brushes *bd* and *bw* with simultaneous transfer will still be referred to later on. The construction and mounting of the brushes *bw* is the same as in the case of the brushes *bd*.

Card feed

Figure 4:
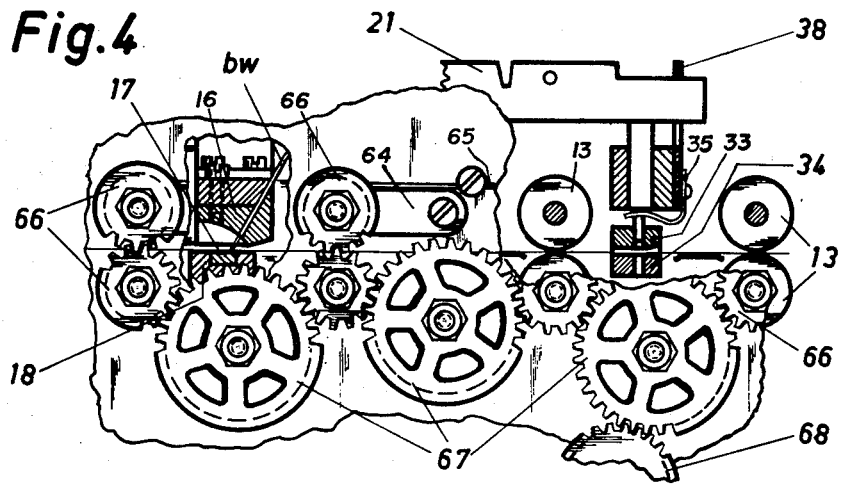
Fig. 4 shows in section the analyzing brushes for the perforation repetition and the set of punches which are common to all decks and serve both for repetition punching and for card reproducing, as viewed from the rear side of the machine.

The cards I are inserted in the magazine 11 and the cards II in the magazine 12 (Fig. 3) as already mentioned. Below the two magazines are disposed slides 42 (Fig. 6) which may slide to and fro upon the round guides 43. At the one end the guides 43 are screwed to the bracket 44 and are moreover held by the cross bar 45. The slides 42 carry two adjustable knives 46. The movement of the slide is effected by the crank 47 on the shaft 48 which is driven through gears 49 and 51 (Fig. 7) from the locking wheel shaft 52 and 53 respectively rotating once per card cycle. The locking wheel shaft 52 serves for the drive of the card feed of card II and the locking wheel shaft 53 (Figs. 4 and 5) for the drive of the card feed for card I. Through link 54 the rocker 55 is linked to the crank 47 (Fig. 6) said rocker being fast on the shaft 56. On this shaft there is also fast the lever 57. The lever 58, however, is loosely rotatable on the shaft 56. It is connected through set screw 59 to the lever 57 and may be displaced with respect to the latter by means of the screw thereby permitting an exact adjustment of the card knives. At its upper end the lever 58 is forked and embraces a bolt 61 seated in an arm 62 of the slide 42 and serving to move the latter during the rocking movement of the lever. The card knives 46 will then move the cards between the rollers 13.

The feed of the card to the analyzing or punching device and finally to the card receivers is effected by the rollers. The shafts 63 of the lower rollers are mounted in the side walls of the machine whereas the shafts for the upper rollers are mounted in the arms 64 (Fig. 5) the latter being urged downwardly by the springs 65. To the one end of the shaft 63 there are secured gears 66. The gears of the upper rollers are in each instance driven by those of the lower rollers. Moreover, the gears of the lower rollers mesh with idle gears 67 driven by the gears 68 on the shafts 52 and 53 respectively. Through the idle gears 67 the drive to the remaining feed rollers is also effected.

The drive of the shaft 52 and 53 respectively is effected step by step from the motor 69 (Figs. 3, 7 and 8) by means of a step by step shifting mechanism. Through pinion 71 the motor drives the wheel 72 of the shaft 73 and from there by means of the pinion 74 the gear 75 of the shaft 76. All shafts just described are mounted in the side walls of the machine. The gear 75 meshes with the gear 77 being rigidly connected to the cam 78 and being mounted resiliently rotatable upon the shaft 52. The cam 78 actuates a lever 79 having a pawl 82 mounted on its arm 81. The ratchet wheel 83 and therewith the shaft 52 are driven step by step by the pawl 82.

The drive of the shaft 53 is effected in the same manner through lever 79 rockably mounted about a bolt in the middle portion of the machine and carrying on its lower end the pawl 84 (Fig. 5) which engages the ratchet wheel 85. The lever 79 moves in the guides 86 and 87 (Figs. 5 and 7) and is drawn towards the cam 78 by the spring 88. The pawls 82 and 84 are resiliently urged against the ratchet wheels 83 and 85. In order to prevent a backward movement of the ratchet wheels 83 and 85 locking springs 89 and 91 are provided, operating upon special locking wheels 80. Accordingly, the lever 79 driven by the cam 78 drives at the same time the ratchet wheels 83 and 85 through the pawls 82 and 84.

Figure 11:
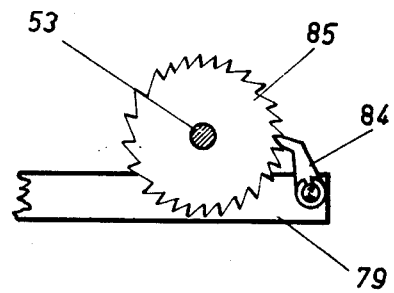
Fig. 11 shows the ratchet wheel for the drive of the feed rollers.

In order to reduce the idle time during deck or card change the ratchet and locking wheels are provided with a greater pitch for this range. In accordance therewith a faster card feed will take place during the deck or card change than during the analysis. Hence the travel of the pawl must be chosen in such a manner that it can feed over the largest pitch. As regards determination of the different pitches it must be considered that the largest pitch must be smaller than two of the smallest pitches. One of the two ratchet wheels is again shown in Fig. 11.

When the cards have passed through the analyzing and punching device respectively they will drop into the card receivers 14 or 15 in which the card supports 92 (Fig. 3) are provided. The supports are guided by the rollers 93 and are urged upward by the springs 94. When the card support has reached its lower position it will open its contact $m^1$ and $m^2$ respectively thereby stopping the machine.

Plug board

As has been mentioned above in the case of card reproducing a column selection and besides an arbitrary column interchanging must be possible within the decks, and also a selective establishment of connections between the various brushes $bw$ and the punch of the same column must be possible. This is obtained by the wireless plugging.

Each switching element which is to be combined with another such as, for instance, the brushes $bd$ with the selector magnets W, has a bar 90 or 95 (Figs. 13, 14 and 15) associated therewith. The selector magnets W are connected to the bars 95 and the brushes $bd$ are connected to the bars 90. The bars are so arranged relatively to each other that they cross the bars of the switching elements to which they are to be electrically connected. Bars crossing each other are arranged in different layers. Wherever there is a crossing there is a hole in the bars. By means of the plugs 96 the connection between the bars may be established by inserting said plugs at the corresponding crossing points.

In case of repetition punching an interchanging of columns is not necessary. It is therefore sufficient if there is one socket 97 each under the three bars for each selector magnet which are all commonly connected to the associated brush $bw$. The connection between bar and socket is also effected by a plug. In Fig. 14 wherein the bars 95 correspond to three like columns of the three decks, accordingly all three plugs would have to be inserted if repetition punching is to be effected in this column of all three decks.

In accordance with the three decks the plug board is divided into three plug fields as diagrammatically shown in Fig. 13. In the range $bd$ the brushes $bd$ of the card I are connected and in the three rangs W the selector magnets for the punching device. Three connections lead from each selector magnet to the plug board, each of them terminating in one of the three ranges W. Through the contacts $u_I$ and $u_{II}$ the connection of the magnets to one of the three plug fields is always effected in agreement with the card passage. Each brush $bw$ has three sockets 97 associated therewith in the plug board, each of them being arranged in one of the three ranges $bw$ and always below the bar of the associated selector magnet. The three sockets are wired in parallel with respect to each other and are indicated by short cross strokes in Fig. 13.

If now the first deck is under the analyzing or punching device the selector magnets are connected to the left field W, if the second deck is thereunder they are connected to the middle field and if the lowermost deck is thereunder the magnets are connected to the right hand field (Fig. 13). The column selection must therefore be plugged to the left hand field for the first deck, to the middle field for the second and to the right hand field for the lowermost deck. The arrangement of the bars for one brush $bd$ and one selector magnet W as well as the sockets for one brush $bw$ may be seen from Fig. 14. Fig. 15 shows the section through the plug board. The two layers of bars 90 and 95 are separated from each other by the insulating plates 98. The connection between the bars of the two layers is effected by the plugs 96.

As may be seen from Fig. 1 the designation of the columns runs consecutively from the upper to the lower deck. These designations may now be entered in a corresponding running manner over the whole range W since this range comprises 90 bars each bar being associated with a column. On wiring of one field and particularly of the punching device the division into two decks therefore no longer appears which means a facilitation for the operator. Erroneous wiring is easily avoided by noticing on plugging that not more than one plug is inserted in each bar. If repetition punching is to take place the plug must be inserted into the socket 97 for the respective column. At each other plugging position card reproducing will be effected.

Contact control

Figure 9:
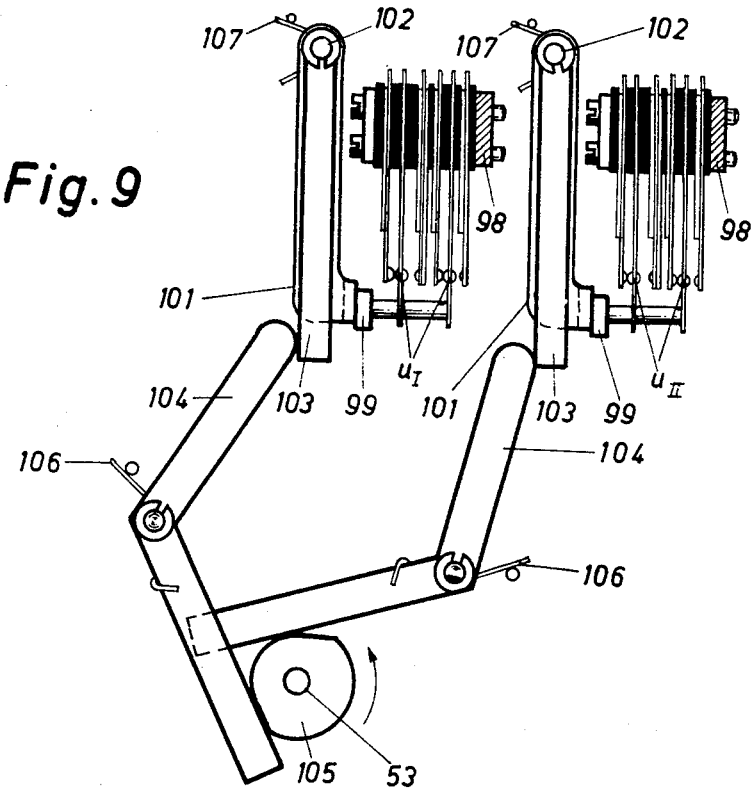
Fig. 9 shows the cam control for the deck shifting contacts, also viewed from the rear side of the machine.

As has just been described on deck or card change the connection of the selector magnets to the bars is shifted. This shifting is effected by means of contacts $u_I$ and $u_{II}$ being arranged between the bars and the selector magnets. Accordingly 30 contacts $u_I$ must be provided and 30 contacts $u_{II}$. The 30 contacts $u_I$ and $u_{II}$ are fastened on the stirrups 98 (Fig. 9) which are screwed to the side walls of the machine. In order to save space always two shifting contacts have been arranged above each other. The contacts are actuated by the two yokes 99 carried by the arms 101 on the shafts 102. To the shafts 102 are also fastened the levers 103 which are rocked through levers 104 by cams 105 in clockwise direction. The yokes 99 are held by springs 107 in their home position, and the levers 104 are pressed by springs 106 against the cam 105. The latter is fast to the shaft 53 which rotates once per card advance. Shape and position of the cam 105 as well as of the levers 104 has been chosen in such a manner that upon the first deck change the contacts $u_I$ will shift and upon the second deck change the contacts $u_{II}$, and that moreover, on card change during analysis of the first deck the contacts $u_I$ as well as the contacts $u_{II}$ will return to their home position.

The brushes must be prevented from being raised from the card while current is passing through them since otherwise harmful sparking could arise. In order to avoid this an impulse contact $i$ (Fig. 7) is provided. It is controlled by a cam 108 on the shaft 24 which rotates once per card step. The position and dimensions of the cam 108 have been chosen in such a manner that a current impulse will flow through the brushes as soon as there is a position under them.

Figure 10:
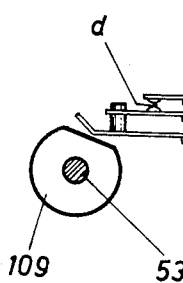
Fig. 10 shows a cam contact.

Moreover the current can flow to the brushes only if there is a deck under the latter. During card change the current circuit to the brushes must be interrupted in order to avoid erroneous perforation. This is obtained by means of the contact $d$ (Fig. 10). The latter is controlled by the cam disk 109 on the shaft 53 rotating once per card cycle. As has been mentioned above the shaft 53 serves at the same time for the drive of the feed rollers and of the card knives for the card I. The shape of the cam as well as its position have been so determined that the current circuit is interrupted on deck or card change.

*Circuit diagram (Fig. 12)*

In the illustration of the circuit diagram for the card reproducer a simplified method has been chosen, as is generally used in the art of communication. If several identical units are provided, such as clutch magnets and brushes, only one of them is shown in the diagram while the remainder are indicated by the distribution connections only. The number of the units is indicated by the Arabic index number. The magnets are indicated by capitals and the contacts by small letters. Manually actuated contacts are characterized by a key-like hook on the upper end of the movable contact member. The contacts are shown in the positions which they occupy when the machine is at rest.

If the machine is switched on it will not yet start to run. Only if the start key $a$ is depressed will the motor receive current through said key so that it will begin to run and will feed cards to the analyzing and punching device respectively. If the card I arrives with its upper deck under the set of analyzers with the brushes $bd$ it will actuate a card lever of known construction which has been omitted in the drawing for reasons of clarity. The card lever closes its contact $k^1$. If the card II has arrived at the analyzing device it will actuate there also a card lever which closes the contact $k^2$. Now, current can flow from negative through the contacts $k^2$, $m^2$, $m^1$, $k^1$ to the motor so that the start key $a$ can be released.

If the first hole position is under the analyzers $bd$ and $bw$ the two cam contacts $i$ and $d$ are also closed, so that current can flow from negative through the contacts $k^2$, $m^2$, $m^1$, $k^1$, $d$, $i$, through the brushes $bd$ or $bw$, the plug board indicated symbolically by a circle in dotted lines, and the contact $u_I$ through the selector magnets W to positive. The selector magnets W will respond and will adjust the selector bars 21 whereupon perforation will be effected in the card located under the punching device. Shortly before the card is fed to the next hole position the cam contact $i$ opens and interrupts the whole controlling current circuit.

If the next hole position is under the brushes the contact $i$ closes and the current circuit will again be established as has just been described.

If the upper decks of the card I and the card II have been analyzed and if the following card II has been punched the middle deck will arrive under the analyzing or punching device. At the same time shifting of the selector magnets will take place upon the middle plug field by means of contacts $u_I$. The analyzing cycle for the middle deck is the same as that of the first deck with the only difference that now the current will flow through the middle plug field. After the transferring operation in respect of the middle deck the right hand plug field is connected by means of the contacts $u_{II}$ so that now transfer in respect of the lower deck can be effected. Upon card change then the contacts $u_I$ will return to home position as has already been described whereby the plug field for the upper deck is again connected. Moreover during the card change the contact $d$ has also been opened which interrupts the current circuit to the analyzing device. If now the first position of the next cards are under the analyzing devices the contact $d$ will close and the operating cycle just described begins anew.

During the analysis of the upper deck the contacts $u_{II}$ will be restored to their home position. This, however, has no influence upon the machine since the current circuit through the contacts $u_{II}$ is still interrupted through the contacts $u_I$. While there has been shown and described and pointed out the fundamental novel feature of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In an automatic multiple-deck card reproducing machine for punching receiving cards under the joint control of a preceding receiving card and of pattern cards, each kind of said cards having a plurality of adjacent record columns in each deck, feeding means along a feeding path for said receiving cards, a single set of punching means across said feeding path extending over all columns of a deck but common to all decks, a single set of analyzing means across said feeding path extending over all columns of a deck but common to all decks, said feeding means feeding said receiving cards automatically one by one at first past said punching means and then past said analyzing means, the decks of the preceding card being fed one by one past said analyzing means while the corresponding decks of the subsequent card are fed one by one past said punching means, means for controlling said punching means by said receiving card analyzing means, feeding means along a feeding path for pattern cards, a single set of analyzing means across said pattern card feeding path extending over all columns of a deck but common to all decks, said pattern card feeding means feeding said pattern cards automatically one by one past said analyzing means in synchronism with the passage of this receiving cards past said punching means, means for controlling said punching means by said pattern card analyzing means, a separate set of selection means for the columns of each deck for selectively eliminating the control of said receiving card analyzing means upon said punching means, a separate set of selection means for the columns of each deck for selectively eliminating the control of said pattern card analyzing means upon said punching means, and means for automatically rendering operative said various sets of selection means of each kind one by one in accordance with the passage of the co-ordinated decks under the receiving card analyzing means, the pattern card analyzing means and the punching means respectively.

2. In an automatic multiple-deck card reproducing machine for punching receiving cards under the joint control of a preceding receiving card and of pattern cards, each kind of said cards having a plurality of adjacent record columns in each deck, each column comprising a plurality of index points, feeding means along a feeding path for said receiving cards, a single row of punches across said feeding path including one punch for each column and extending over all columns of a deck but common to all decks, a single row of analyzers across said feeding path including one analyzer for each column and extending over all columns of a deck but common to all decks, said feeding means feeding said receiving cards automatically index-point-by-index-point at first past said row of punches and then past said row of analyzers, the index points of a deck of the preceding card being fed index-point-by-index-point past said row of analyzers while the corresponding index points of the corresponding deck of the subsequent card are fed index-point-by-index-point past said row of punches, means for controlling said punches by said receiving card analyzers, feeding means along a feeding path for the pattern cards, a single row of analyzers across said pattern card feeding path including one analyzer for each column and extending over all columns of a deck but common to all decks, said pattern card feeding means feeding said pattern cards automatically index-point-by-index-point past said row of analyzers in synchronism with the passage of the receiving cards past said row of punches, means for controlling said punches by said pattern card analyzers, a separate set of selection means for the columns of each deck for selectively eliminating the control of said receiving card analyzers upon said punches, a separate set of selection means for the columns of each deck for selectively eliminating the control of said pattern card analyzers upon said punches, and means for automatically rendering operative said various sets of selection means of each kind one by one in accordance with the passage of the co-ordinated decks under the row of receiving card analyzers, the row of pattern card analyzers and the row of punches respectively.

References Cited in the file of this patent

UNITED STATES PATENTS

| | | |
|---|---|---|
| Re. 21,133 | Lake | June 27, 1939 |
| 2,032,805 | Lake | Mar. 3, 1936 |